United States Patent
Prakash et al.

(10) Patent No.: US 11,593,697 B2
(45) Date of Patent: Feb. 28, 2023

(54) METHOD FOR AMPLITUDE ESTIMATION WITH NOISY INTERMEDIATE-SCALE QUANTUM COMPUTERS

(71) Applicant: QC Ware Corp., Palo Alto, CA (US)

(72) Inventors: Anupam Prakash, Palo Alto, CA (US); Iordanis Kerenidis, Paris (FR)

(73) Assignee: QC Ware Corp., Palo Alto, CA (US)

( * ) Notice: Subject to any disclaimer, the term of this patent is extended or adjusted under 35 U.S.C. 154(b) by 332 days.

(21) Appl. No.: 16/892,229

(22) Filed: Jun. 3, 2020

(65) Prior Publication Data

US 2021/0287126 A1 Sep. 16, 2021

Related U.S. Application Data

(60) Provisional application No. 62/987,374, filed on Mar. 10, 2020.

(51) Int. Cl.
*G06N 10/00* (2022.01)
(52) U.S. Cl.
CPC .................................. *G06N 10/00* (2019.01)
(58) Field of Classification Search
None
See application file for complete search history.

(56) References Cited

FOREIGN PATENT DOCUMENTS

WO WO 2019/204678 A1 10/2019

OTHER PUBLICATIONS

Giurgica-Tiron, T. et al., "Low depth algorithms for quantum amplitude estimation," arXiv:2012.03348, Dec. 2020, pp. 1-27.
PCT International Search Report and Written Opinion, PCT Application No. PCT/US21/14746, dated Apr. 15, 2021, 12 pages.
Brassard, G. et al., "Quantum Amplitude Amplification and Estimation," arXiv 0005055, 2002, pp. 1-32.
Suzuki, Y. et al., "Amplitude estimation without phase estimation," Quantum Information Processing, 2020, vol. 19, No. 75, pp. 1-17.

*Primary Examiner* — Jany Richardson
(74) *Attorney, Agent, or Firm* — Fenwick & West LLP

(57) ABSTRACT

Embodiments relate to a method for estimating an amplitude of a unitary operator U to within an error ε by using a quantum processor configurable to implement the unitary operator U on a quantum circuit. The quantum circuit has a maximum depth S can implement the unitary operator no more than D times in a single run. A schedule of iterations n=1 to N based on the error ε and number D is determined. Each iteration n characterized by a schedule parameter kn. kn≤D for all n and kn increases at a rate that is less than exponential. The iterations n may be sequentially executed. In each iteration, the quantum processor is configured to sequentially apply and execute the unitary operator U kn times on the quantum circuit. A non-quantum processor then estimates the amplitude of the unitary operator U based on the measured resulting states.

20 Claims, 2 Drawing Sheets

METHOD FOR AMPLITUDE ESTIMATION WITH NOISY INTERMEDIATE-SCALE QUANTUM COMPUTERS

CROSS-REFERENCE TO RELATED APPLICATION

This application claims priority under 35 U.S.C. § 119(e) to U.S. Provisional Patent Application Ser. No. 62/987,374, "A method for amplitude estimation with noisy intermediate scale quantum computers," filed on Mar. 10, 2020, which is incorporated by reference in its entirety.

BACKGROUND

1. Technical Field

The disclosure is in the field of quantum algorithms, in particular it provides a method for implementing the fundamental primitive of amplitude estimation in a way that reduces the necessary depth of the quantum circuits and remains faster than the classical algorithm.

2. Description of Related Art

Amplitude estimation (AE) is a quantum algorithm with many applications, for example to approximate counting and Monte Carlo methods in mathematical finance. A general setting for the amplitude amplification algorithm is the following: we are given an implementation of the unitary U (which we will henceforth call the oracle, the number of times the algorithm runs the circuit for U will be the number of oracle calls T) that performs the transformation $U|0\rangle = \sin(\theta)|0\rangle + \cos(\theta)|1\rangle$. The goal of the amplitude estimation algorithm is to estimate $\cos(\theta)$ within an additive error of $\varepsilon$.

The literature on amplitude estimation focuses on minimizing the number of oracle calls for the above task. It is known that the number of oracle calls for the amplitude estimation task is $O(1/\varepsilon)$ in the quantum setting, as opposed to $O(1/\varepsilon^2)$ for classical algorithms, which in theory provides a considerable speedup.

However, this algorithm applies the unitary $U^k$ for $k=O(1/\varepsilon)$, in other words applies the unitary U sequentially $O(1/\varepsilon)$ times, thus leading to a quantum circuit with extremely high depth (note that in some cases, the unitary U itself can have considerable depth, in particular for real world applications such as Monte Carlo estimation, but if we want the error $\varepsilon$ to be of the order of $10^{-3}$ this depth will multiplied by 1000 in the above algorithm, which makes the algorithm way beyond reach for NISQ quantum computers).

One of the previous results that makes some progress towards adapting AE for NISQ devices is "Amplitude Estimation Without Phase Estimation" by Suzuki et al. (*Quantum Inf Process* 19, 75 (2020). https://doi.org/10.1007/s11128-019-2565-2). The paper provides a template where the algorithm performs a schedule of operations that is defined by a series of parameters $(k_1, k_2, \ldots, k_t)$ and a constant $N_{shot}$ of the following form:

For each one of the parameters $k_i$, and for $N_{shot}$ times (depending on the noise of the operations), apply the unitary U sequentially $k_i$ times and measure the resulting state This operation is followed by classical post-processing of the measurement results in order to provide an estimate of the amplitude as required. Suzuki et al. argued that with a schedule defined by the parameters $k_i = 2^i$, starting from $i=0$ to $i=\log(1/\varepsilon)$, the quantum algorithm can provide a good estimate to the amplitude. However, the Suzuki et al. algorithm still needs to apply $U^k$ for $k=O(1/\varepsilon)$, thus the depth of the quantum circuit remains prohibitively large. The main advantage of their algorithm was the use of classical post-processing to replace a computationally expensive quantum phase estimation step which one needs in the original AE algorithm of Brassard el al. on top of the oracle calls. Thus, while the Suzuki et al. AE algorithm reduces the depth of the original AE algorithm of Brassard et al. by avoiding the quantum phase estimation step, the number of sequential oracle calls that one needs to perform remains $O(1/\varepsilon)$ and thus this algorithm is way beyond the capabilities of NISQ machines.

SUMMARY

Embodiments relate to a method for estimating an amplitude of a unitary operator U to within an error $\varepsilon$ by using a quantum processor that is configurable to implement the unitary operator U on a quantum circuit. The quantum circuit has a maximum circuit depth S and can implement the unitary operator no more than D times in a single run. A schedule of iterations n=1 to N based on the error $\varepsilon$ and the number D is determined. Each iteration n characterized by a schedule parameter $k_n$. $k_n \le D$ for all n and $k_n$ increases at a rate that is less than exponential. The iterations n may be sequentially executed. In each iteration, the quantum processor is configured to sequentially apply the unitary operator U $k_n$ times on the quantum circuit, and the quantum processor executes the quantum circuit. The resulting state of the quantum circuit is measured. A non-quantum processor then estimates the amplitude of the unitary operator U based on the measured resulting states.

Other aspects include components, devices, systems, improvements, methods, processes, applications, computer readable mediums, and other technologies related to any of the above.

Figure 1:
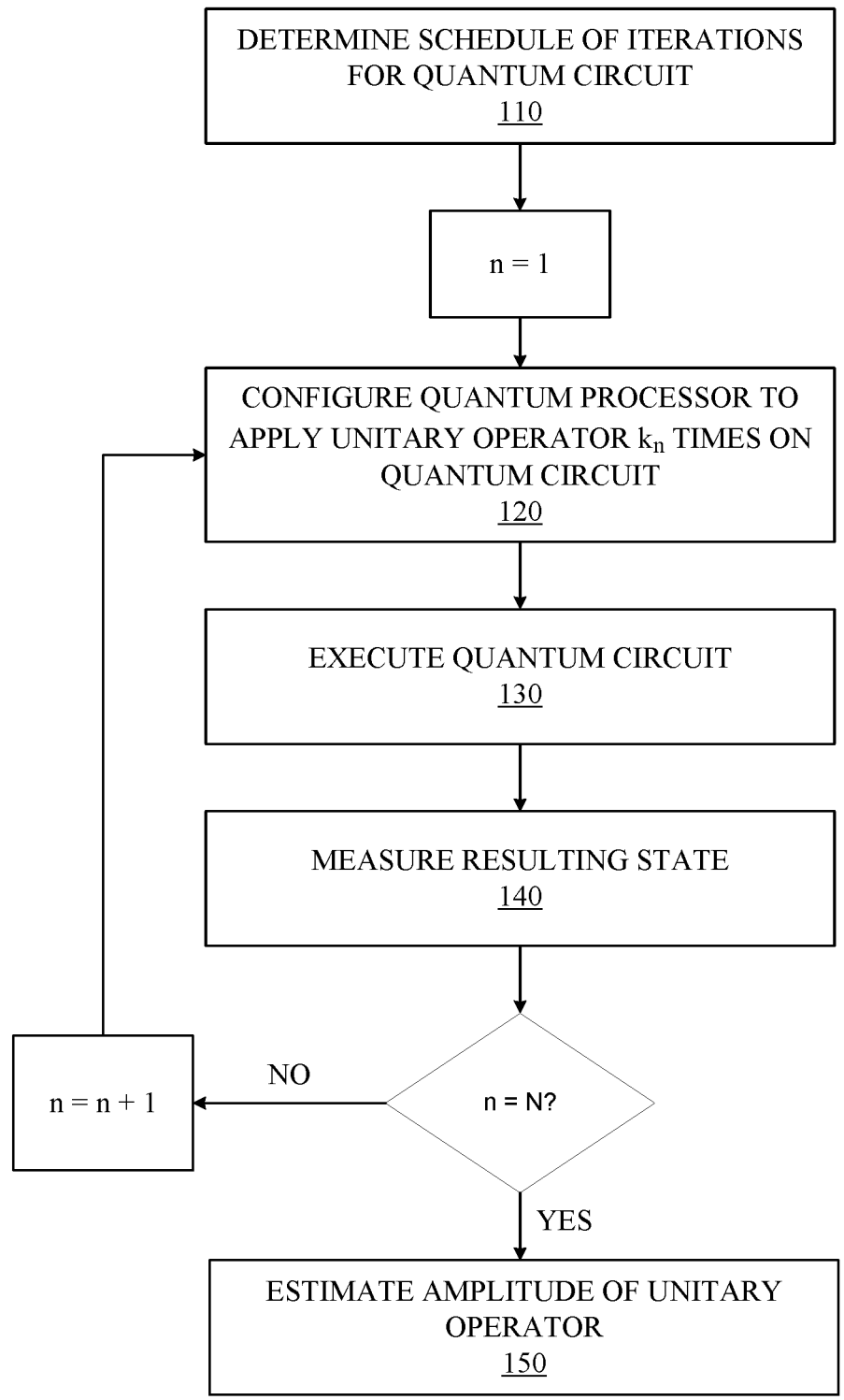
FIG. 1 is a flowchart of a method for estimating the amplitude of a unitary operator, according to an embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The following description relate to preferred embodiments by way of illustration only. It should be noted that from the following discussion, alternative embodiments of the structures and methods disclosed herein will be readily recognized as viable alternatives that may be employed without departing from the principles of what is disclosed.

Embodiments relate to reducing the depth of amplitude estimation circuits (e.g., for low-depth noisy intermediate-scale quantum (NISQ) computers), while still retaining a quantum advantage over classical algorithms. NISQ computers may have less than 1000, 500, or 300 qubits. In one aspect, we provide a novel AE algorithm through a different schedule that enables us to get a tradeoff between the depth of the quantum circuit and the speedup the quantum algorithm achieves compared to the classical algorithm. In some embodiments, we propose a polynomial schedule with schedule parameter $k_n = \lceil n^\alpha \rceil$, for example, for an exponent $\alpha \in (0,2]$, where the choice of the exponent depends on the specific problem and/or quantum circuit, and starting from n=1 and going to the largest integer N for which the number of oracle calls $\lceil n^\alpha \rceil$ can be handled by the NISQ computer we use to implement the algorithm. For example, if $\alpha$=2, then for a first iteration (n=1), the quantum circuit in the NISQ computer performs one oracle call. For a second iteration (n=2), the circuit performs four oracle calls. For a third iteration (n=3), the circuit performs nine oracle calls. The schedule may continue until the maximum number of oracle calls is reached (due to the limited depth of the given quantum circuit). For example, $k_N \leq D$, where D is the maximum number of oracle calls the quantum circuit can perform in a single run. D is based on the depth of the unitary operator U and a maximum depth S of the circuit (e.g., depth(U)*D≤S).

After each iteration, the resulting quantum state is measured and stored. After the schedule is performed, the amplitude of the unitary operator U may be determined by a non-quantum processor based on the measured states. In some embodiments, the iterations do not need to be performed sequentially from n=1 to N. For example, the iterations can be performed in parallel (e.g., on separate quantum circuits).

Note that if D is $O(1/\varepsilon)$ then we can implement the AE algorithm of Suzuki et al. but our algorithm works even if the parameter D is a small constant (e.g., D can be as small as 5).

The observed tradeoffs of this schedule may be $DT=1/\varepsilon^2$ where T is the total number of oracle calls ( $$T = \sum_{n=1}^{N} k_n$$

Thus, varying the exponent $\alpha$ in this interval gives a smooth tradeoff between the circuit depth and the total number of oracle calls T (the miming time). This allows us for a given use case (e.g., approximate counting or Monte Carlo) to find tradeoffs between circuit depth and running time so that we are able to offer quantum advantages for AE settings where the circuit depth is limited. This is a significant innovation because it allows us to demonstrate a quantum advantage for AE in the setting where circuit depth is limited (even for a setting where we cannot run circuits of depth more than 50). None of the previously known algorithms can be implemented in this setting.

FIG. 1 is a flowchart of a method 100 for estimating the amplitude of a unitary operator U to within an error e, according to an embodiment. The method uses a quantum processor that is configurable to implement the unitary operator U on a quantum circuit. The quantum circuit has a maximum depth S and can implement the unitary operator no more than D times in a single run. The steps of the method may be performed in different orders, and the method may include different, additional, or fewer steps.

A schedule of iterations n=1 to N based on the error ε and the number D is determined 110. Each iteration n characterized by a schedule parameter $k_n$. $k_n \leq D$ for all n and $k_n$ increases at a rate that is less than exponential. The iterations n may be sequentially executed. In each iteration n, the quantum processor is configured to sequentially apply 120 the unitary operator U $k_n$ times on the quantum circuit, and the quantum processor executes 130 the quantum circuit. The resulting state of the quantum circuit is measured 140 (e.g., the state of each qubit in the quantum circuit is recorded). The resulting states are stored. A non-quantum processor then estimates 150 the amplitude of the unitary operator U based on the stored resulting states. In some embodiments, the non-quantum processor performs one or more amplitude estimates before the schedule is finished (e.g., after each iteration or after every two or more iterations are performed). In some embodiments, steps 110, 120, and 150 are performed by a non-quantum processor and steps 130 and 140 are performed by quantum processor. In some embodiments, $D<O(1/\varepsilon)$ and $T<O(1/\varepsilon^2)$, where $$T = \sum_{n=1}^{N} k_n.$$

If T<50% of $O(1/\varepsilon^2)$, then the method may provide a 2-fold speedup over classical algorithms. If T<20% of $O(1/\varepsilon^2)$, then the method may provide a 5-fold speedup over classical algorithms.

Figure 2:
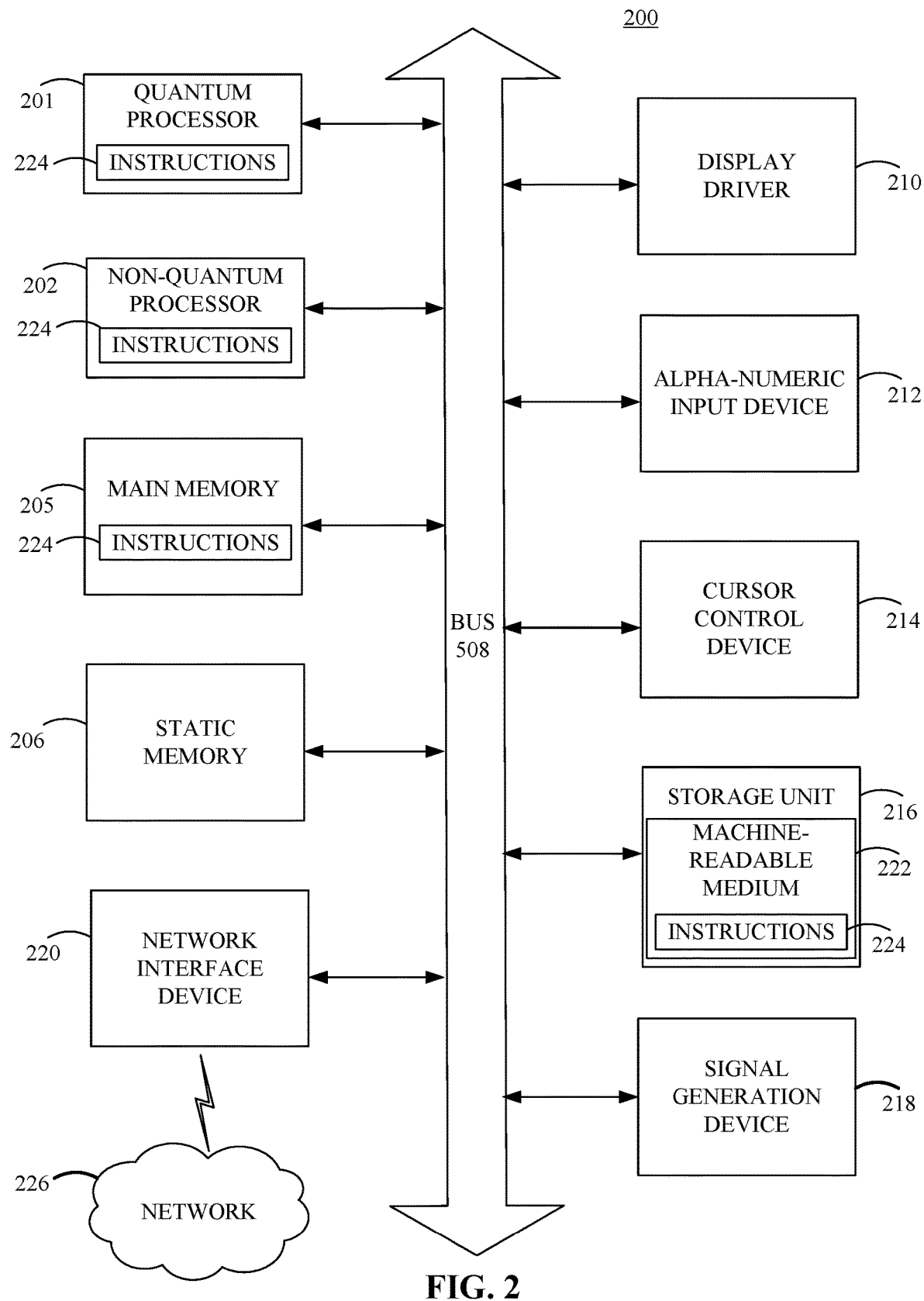
FIG. 2 is a block diagram illustrating components of an example machine able to read instructions from a machine-readable medium and execute them in a processor (or controller), according to an embodiment.

FIG. 2 is a block diagram illustrating components of an example machine able to read instructions from a machine-readable medium and execute them in one or more processors (or controllers), according to some embodiments. Specifically, FIG. 2 shows a diagrammatic representation of a machine in the example form of a computer system 200. The computer system 200 can be used to execute instructions 224 (e.g., program label or software) for causing the machine to perform any one or more of the methodologies (or processes) described herein, such as method 100. In some embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. Note that FIG. 2 and its description describe an example device. Other machines with a quantum processors may operate differently and have more, less, and/or different components.

The machine may be a server computer, a client computer, a personal computer (PC), a tablet PC, a set-top box (STB), a smartphone, an internet of things (IoT) appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processing units (e.g., processors 201 and 202). The processor 202 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these.

The quantum processor 201 may be one or more physical devices that perform processing especially based upon quantum effects, one or more devices that act in such a way, or any other devices that may reasonably be interpreted as exhibiting quantum processing behavior. Quantum processors 201 exploit the laws of quantum mechanics in order to perform computations. Quantum processors 201 commonly use so-called qubits, or quantum bits, rather than the bits used in classical computers. Classical bits always have a value of either 0 or 1. Roughly speaking, qubits have a non-zero probability of existing in a superposition, or linear combination, of 0 and 1. Because quantum processors 201 operate on qubits, the ability of qubits to exist in superpositions of 0 and 1 allows for greatly enhanced performance for certain computational tasks. For example, Shor's algorithm describes how a quantum processor can be used to efficiently factor large integers, which has significant applications and implications for cryptography. Grover's search algorithm describes how a quantum processor can be used to efficiently search a large set of information, such as a list or database.

The quantum processor 201 may be able to configure and execute one or more quantum circuits. A quantum circuit is a model for quantum computation in which the computation is a sequence of quantum gates which are reversible transformations on one or more qubits.

The computer system 200 also includes a main memory 205. The computer system may include a storage unit 216. The processors 201 and 202, memory 204, and the storage unit 216 communicate via a bus 208.

In addition, the computer system 200 can include a static memory 206 and a display driver 210 (e.g., to drive a plasma display panel (PDP), a liquid crystal display (LCD), or a projector capable of displaying the UI 105 to a user). The computer system 200 may also include alphanumeric input device 212 (e.g., a keyboard), a cursor control device 214 (e.g., a mouse, a trackball, a joystick, a motion sensor, or other pointing instrument), a signal generation device 218 (e.g., a speaker), and a network interface device 220, which also are configured to communicate via the bus 208.

The storage unit 216 includes a machine-readable medium 222 on which is stored instructions 224 (e.g., the software modules described in FIG. 2) embodying any one or more of the methodologies or functions described herein. The instructions 224 may also reside, completely or at least partially, within the main memory 205 or within the processors 201 and/or 202 (e.g., within a processor's cache memory) during execution thereof by the computer system 200, the main memory 205 and the processors 201 and/or 202 may also constituting machine-readable media. The instructions 224 may be transmitted or received over a network 226 aria the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store the instructions 224. The term "machine-readable medium" shall also be taken to include any medium that is capable of storing instructions 224 for execution by the machine and that cause the machine to perform any one or more of the methodologies disclosed herein. The term "machine-readable medium" includes, but not be limited to, data repositories in the form of solid-state memories, optical media, and magnetic media.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for estimating an amplitude of a unitary operator U to within an error $\varepsilon$ by using a quantum processor that is configurable to implement the unitary operator U on a quantum circuit, wherein the quantum circuit can implement the unitary operator no more than D times in a single run and $D<O(1/\varepsilon)$, the method comprising:
    determining a schedule of iterations n=1 to N based on the error $\varepsilon$ and the number D, each iteration n characterized by a schedule parameter $k_n$, where $k_n \leq D$ for all n, $k_n$ increases at a rate that is less than exponential, $k_n$ is polynomially bounded, and $T<O(1/\varepsilon^2)$, where $$T = \sum_{n=1}^{N} k_n;$$

sequentially executing the iterations n by:
        configuring the quantum processor to sequentially apply the unitary operator U $k_n$ times on the quantum circuit;
        the quantum processor executing the quantum circuit; and
        measuring a resulting state of the quantum circuit; and
    estimating the amplitude of the unitary operator U based on the measured resulting states.

2. The method of claim 1, wherein $T<50\%$ of $O(1/\varepsilon^2)$.
3. The method of claim 2, wherein $T<20\%$ of $O(1/\varepsilon^2)$.
4. The method of claim 1, wherein $k_N=D$.
5. The method of claim 1, wherein $$\varepsilon = \frac{1}{\sqrt{TD}}, \text{ where } T = \sum_{n=1}^{N} k_n.$$

6. The method of claim 1, wherein $k_n$ is based on $n^\alpha$, where $\alpha$ is a constant and is greater than 0.
7. The method of claim 6, wherein $\alpha \in (0,2]$.
8. The method of claim 6, wherein $k_n = \lceil n^\alpha \rceil$.
9. The method of claim 6, wherein $k_n = \lfloor n^\alpha \rfloor$.
10. The method of claim 6, wherein a is predetermined such that $T<O(1/\varepsilon^2)$, where $$T = \sum_{n=1}^{N} k_n.$$

11. The method of claim 6, wherein increasing a increases c and decreases a running time of the schedule and decreasing a decreases c and increases the running time of the schedule.

12. The method of claim 1, wherein one or more of the iterations n are executed multiple times.

13. The method of claim 1, wherein for each iteration n, the quantum processor is configured to sequentially apply the unitary operator U $k_n$ times on the quantum circuit using a depth of $Ak_n$, where A is the depth of the unitary operator U.

14. The method of claim 1, wherein a maximum circuit depth of the quantum circuit is less than 50.

15. The method of claim 1, wherein a maximum depth of the quantum circuit is less than 20.

16. The method of claim 1, wherein c is less than or equal to 0.01.

17. The method of claim 1, wherein the quantum processor contained in a noisy intermediate-scale quantum (NISQ) computer with less than 500 qubits.

18. The method of claim 1, wherein D=5.

19. A method for estimating an amplitude of a unitary operator U to within an error $\varepsilon$ by using a quantum processor that is configurable to implement the unitary operator U on a quantum circuit, wherein the quantum circuit can implement the unitary operator no more than D times in a single run, $D<O(1/\varepsilon)$, and a maximum depth of the quantum circuit is less than 200 and $\varepsilon$ is less than or equal to 0.1, the method comprising:
   determining a schedule of iterations n=1 to N based on the error $\varepsilon$ and the number D, each iteration n characterized by a schedule parameter $k_n$, where $k_n \leq D$ for all n, $k_n$ increases at a rate that is less than exponential, and $T<O(1/\varepsilon^2)$, where $$T = \sum_{n=1}^{N} k_n;$$

sequentially executing the iterations n by:
      configuring the quantum processor to sequentially apply the unitary operator U $k_n$ times on the quantum circuit;
      the quantum processor executing the quantum circuit; and
      measuring a resulting state of the quantum circuit; and
   estimating the amplitude of the unitary operator U based on the measured resulting states.

20. A non-transitory computer-readable storage medium comprising stored instructions for estimating an amplitude of a unitary operator U to within an error $\varepsilon$ by using a quantum processor that is configurable to implement the unitary operator U on a quantum circuit, wherein the quantum circuit can implement the unitary operator no more than D times in a single run and $D<O(1/\varepsilon)$, the stored instructions, when executed by a computer system, cause the computer system to perform operations comprising:
   determining a schedule of iterations n=1 to N based on the error $\varepsilon$ and the number D, each iteration n characterized by a schedule parameter $k_n$, where $k_n \leq D$ for all n, $k_n$ increases at a rate that is less than exponential, $k_n$ is polynomially bounded, and $T<O(1/\varepsilon^2)$, where $$T = \sum_{n=1}^{N} k_n;$$

sequentially executing the iterations n by:
      configuring the quantum processor to sequentially apply the unitary operator U $k_n$ times on the quantum circuit;
      receiving a measurement of a resulting state of the quantum circuit that was executed by the quantum processor; and
   estimating the amplitude of the unitary operator U based on the measured resulting states.

* * * * *